(No Model.)

A. VAN DYKE.
HOSE MENDER.

No. 531,578. Patented Dec. 25, 1894.

WITNESSES:
William Goebel
Theo. G. Hoster

INVENTOR
A. Van Dyke
BY
*[signature]*
ATTORNEYS.

UNITED STATES PATENT OFFICE.

ARTHUR VAN DYKE, OF ORANGE, NEW JERSEY.

HOSE-MENDER.

SPECIFICATION forming part of Letters Patent No. 531,578, dated December 25, 1894.

Application filed April 25, 1894. Serial No. 508,965. (No model.)

*To all whom it may concern:*

Be it known that I, ARTHUR VAN DYKE, of Orange, in the county of Essex and State of New Jersey, have invented a new and Improved Hose-Mender, of which the following is a full, clear, and exact description.

The object of the invention is to provide a new and improved hose mender, which is simple and durable in construction, and more especially designed for quickly and conveniently mending flexible garden or other hose.

The invention consists of a tube surrounded at each end with a shell in the form of the frustum of a cone.

The invention also consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1:
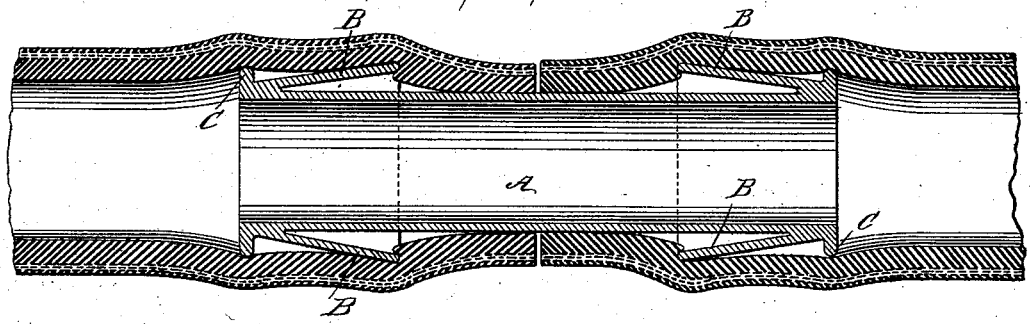
Figure 2:
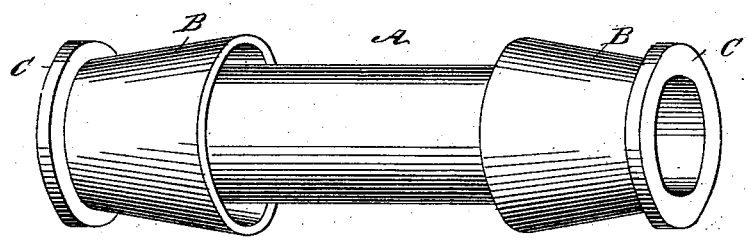
Figure 3:
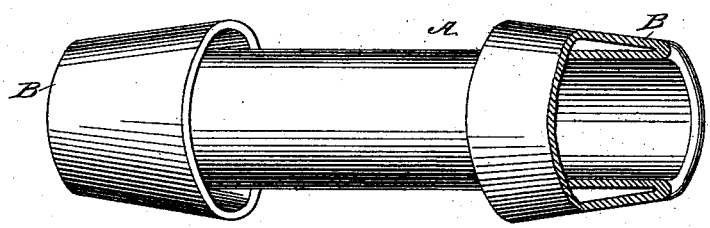

Figure 1 is a sectional side elevation of the improvement as applied. Fig. 2 is a perspective view of the improvement; and Fig. 3 is a perspective view of a modified form of the improvement, with parts in section.

The improved hose mender is provided with a tube A, surrounded at each end by a shell B, preferably made in the shape of the frustum of a cone, with the base turned inward and the small end united with the extreme outer end of the tube A. By this arrangement an annular space is formed between each shell B and the tube A. On the extreme outer ends of the tube A may also be formed a bead C, as plainly illustrated in Figs. 1 and 2.

The device is used as follows: When a hose is broken, then the operator cuts the broken part out and slips the ends of the cut hose over the shells B, until the ends of the hose extend beyond the base ends of the shells B, as indicated in Fig. 1. The tube A now makes a connection between the hose ends, and the water or other liquid can now pass through the hose without leakage. When the hose is used, then the water passing through the hose exerts a longitudinal strain on the hose, whereby the ends of the hose at the tube A, tend to be drawn over the shells B, but as the hose extends beyond the base ends of the shells, and inward toward the tube A, the edges of the bases of the shells will be embedded in the hose, so that a portion of the hose will pass under the open end of the shell, as illustrated in Fig. 1, whereby the hose will be prevented from slipping off the shells B. Thus it will be seen that the hose ends are securely held in place on the shells, and communication is established by the tube A, as previously mentioned.

In case the head C is used, an additional resistance is provided against the slipping off of the hose end, as the said head embeds itself in the elastic hose, as shown in Fig. 1, thereby assisting the exterior shell to hold the hose end in position.

Having thus described my invention, I claim as new and desire to secure by Letters Patent—

1. A hose mender, comprising a tube, and a shell secured to and surrounding each end of the tube, an annular space between the inner ends of the shells and the tube being formed, whereby provision is made for the inner edges of the shells embedding themselves in the hose, as and for the purpose set forth.

2. A hose mender, comprising a tube, and a conical shell at each end of the tube, the said shells being secured at their smaller ends to the extreme outer ends of the tube so that the bases of the conical shells will surround the tube and form annular spaces therebetween whereby provision is made for the base edges of the shells embedding themselves in the hose, as set forth.

3. A hose mender, comprising a tube, a shell surrounding each end of the tube and in the form of the frustum of a cone, with the small end united with the tube near the end thereof, and a bead on each end of the tube, substantially as shown and described.

ARTHUR VAN DYKE.

Witnesses:
THEO. G. HOSTER,
C. SEDGWICK.